(12) United States Patent
Rizkalla et al.

(10) Patent No.: US 7,763,096 B2
(45) Date of Patent: Jul. 27, 2010

(54) RECOVERY OF RHENIUM

(75) Inventors: Nabil Rizkalla, Rivervale, NJ (US); Andrzej Rokicki, Mountain Lakes, NJ (US)

(73) Assignee: SD Lizenzverwertungsgesellschaft mbH & Co. KG, Munich (DE)

( * ) Notice: Subject to any disclaimer, the term of this patent is extended or adjusted under 35 U.S.C. 154(b) by 78 days.

(21) Appl. No.: 12/115,779

(22) Filed: May 6, 2008

(65) Prior Publication Data

US 2009/0277305 A1 Nov. 12, 2009

(51) Int. Cl.
C22B 11/00 (2006.01)
(52) U.S. Cl. ............................... 75/721; 75/744; 423/27
(58) Field of Classification Search ................... 75/721, 75/744; 423/27
See application file for complete search history.

(56) References Cited

U.S. PATENT DOCUMENTS

| | | | |
|---|---|---|---|
| 2,876,065 A | 3/1959 | Zimmerley et al. | |
| 2,967,757 A | 1/1961 | Zimmerley et al. | |
| 3,244,475 A | 4/1966 | Churchward | |
| 3,260,658 A | 7/1966 | Churchward | |
| 3,348,942 A | 10/1967 | Davenport | |
| 3,407,127 A | 10/1968 | Davenport | |
| 3,458,277 A | 7/1969 | Platzke et al. | |
| 3,578,395 A | 5/1971 | Kluksdahl et al. | |
| 3,672,874 A * | 6/1972 | Wiley | 423/52 |
| 3,733,388 A | 5/1973 | Ziegler et al. | |
| 3,755,104 A | 8/1973 | Kruesi | |
| 3,770,414 A | 11/1973 | Lake et al. | |
| 3,783,158 A | 1/1974 | Platzke et al. | |
| 3,798,305 A | 3/1974 | Pagnozzi et al. | |
| 3,855,385 A * | 12/1974 | Derosset et al. | 556/45 |
| 3,856,912 A | 12/1974 | Vesely | |
| 3,856,915 A | 12/1974 | Pagnozzi et al. | |
| 3,862,292 A | 1/1975 | Bauer et al. | |
| 3,932,579 A | 1/1976 | Morgan | |
| 4,006,212 A | 2/1977 | Alper et al. | |
| 4,049,771 A | 9/1977 | Quatrini et al. | |
| 4,185,078 A | 1/1980 | Quatrini et al. | |
| 4,278,641 A | 7/1981 | Petrov et al. | |
| 4,321,089 A | 3/1982 | Kruesi et al. | |
| 4,521,381 A | 6/1985 | Douglas et al. | |
| 4,557,906 A | 12/1985 | Douglas et al. | |
| 4,572,823 A | 2/1986 | Ogata et al. | |
| 4,584,185 A | 4/1986 | Douglas et al. | |
| 4,599,153 A | 7/1986 | Bright | |
| 4,599,222 A | 7/1986 | Douglas et al. | |
| 4,599,223 A | 7/1986 | Douglas et al. | |
| 4,604,265 A | 8/1986 | Douglas et al. | |
| 4,761,394 A | 8/1988 | Lauritzen | |
| 4,766,105 A | 8/1988 | Lauritzen | |
| 4,808,738 A | 2/1989 | Lauritzen | |
| 4,820,675 A | 4/1989 | Lauritzen | |
| 4,829,044 A | 5/1989 | Boxhoorn et al. | |
| 4,908,343 A | 3/1990 | Bhasin | |
| 5,011,807 A | 4/1991 | Hayden et al. | |
| 5,057,481 A | 10/1991 | Bhasin | |
| 5,099,041 A | 3/1992 | Hayden et al. | |
| 5,102,848 A | 4/1992 | Soo et al. | |
| 5,187,140 A | 2/1993 | Thorsteinson et al. | |
| 5,364,826 A | 11/1994 | Kemp | |
| 5,407,888 A | 4/1995 | Herzog et al. | |
| 5,418,202 A | 5/1995 | Evans et al. | |
| 5,542,957 A | 8/1996 | Han et al. | |
| 5,545,603 A | 8/1996 | Kemp | |
| 5,663,385 A | 9/1997 | Kemp | |
| 5,739,075 A | 4/1998 | Matusz | |
| 5,801,259 A | 9/1998 | Kowaleski | |
| 5,929,259 A | 7/1999 | Lockemeyer | |
| 6,368,998 B1 | 4/2002 | Lockemeyer | |
| 6,372,925 B1 | 4/2002 | Evans et al. | |
| 7,166,145 B1 | 1/2007 | Han | |
| 2003/0008766 A1 | 1/2003 | Kruger-Tissot et al. | |
| 2003/0119658 A1 | 6/2003 | Allison et al. | |

(Continued)

FOREIGN PATENT DOCUMENTS

DE GB 2 009 119 A 9/1978

(Continued)

OTHER PUBLICATIONS

Abstract of Jafarifar, D. et al., "Ultra fast microwave-assisted leaching for recovery of platinum from spent catalyst" *Hydrometallurgy*, vol. 78, Issues 3-4, Aug. 2005, pp. 166-171.

(Continued)

*Primary Examiner*—George Wyszomierski
*Assistant Examiner*—Tima M McGuthry-Banks
(74) *Attorney, Agent, or Firm*—Scully, Scott, Murphy & Presser, P.C.

(57) ABSTRACT

The present invention relates to a method for recovering rhenium from an ethylene oxide catalyst containing rhenium and at least silver on a solid support, wherein at least a substantial portion of the rhenium present in the catalyst is extracted by intimate contact of the catalyst with one or more polar non-acidic organic solvents substantially free of water such that a rhenium-containing solution is formed containing the polar non-acidic organic solvent and extracted rhenium, the polar non-acidic organic solvent containing one or more oxygen, nitrogen, and/or halogen atoms in its molecular structure.

22 Claims, No Drawings

U.S. PATENT DOCUMENTS

| | | |
|---|---|---|
| 2004/0081602 A1 | 4/2004 | Han et al. |
| 2007/0203351 A1* | 8/2007 | Matusz et al. ............... 549/533 |
| 2007/0227903 A1 | 10/2007 | Turner et al. |

FOREIGN PATENT DOCUMENTS

| | | |
|---|---|---|
| IN | 1998-DE2706 | 9/1998 |
| JP | 2001-25665 | 1/2001 |
| SU | 566443 A | 6/1975 |
| WO | WO 95/07754 | 3/1995 |
| WO | WO 03/082844 A1 | 10/2003 |
| WO | WO 2004/076469 A1 | 9/2004 |

OTHER PUBLICATIONS

Abstract of Mozammel, M. et al., "Breakthrough curves for adsorption and elution of rhenium in a column ion exchange system", *Hydrometallurgy*, vol. 85, Issue 1, Jan. 2007, pp. 17-23.

Angelidis, T.N. et al., "Selective Rhenium Recovery from Spent Reforming Catalysts" *Ind. Eng. Chem. Res.*, vol. 38 (5), 1999, pp. 1830-1836.

* cited by examiner

RECOVERY OF RHENIUM

FIELD OF THE INVENTION

The present invention relates to the recovery of rhenium values from used rhenium-containing catalysts, and particularly, rhenium recovery from ethylene oxide catalysts containing rhenium.

BACKGROUND OF THE INVENTION

Rhenium is an expensive and rare metal that has found a number of niche applications. The metal currently finds predominant use in, for example, petroleum-reforming catalysts (e.g., bimetallic Pt—Re compositions) for the production of high-octane hydrocarbons and in superalloys used in high-temperature turbine engine components. These two applications represent an estimated 20% and 60%, respectively, of the end use of rhenium. Rhenium is also known to improve the high-temperature strength properties of some nickel-based superalloys.

Rhenium has also been increasingly used as a promoter in ethylene oxide catalysts containing silver as the active metal on a solid support. These ethylene oxide catalysts are used on a large scale for the production of ethylene oxide, an important precursor to numerous commodity chemicals (e.g., ethylene glycol) used on a large scale. Ethylene oxidation catalysts typically contain up to about 0.5 wt % rhenium by weight of catalyst. Considering the scarcity and high price of rhenium, the amount of rhenium in these catalysts is substantial. A more detailed understanding of these rhenium-containing ethylene oxide catalysts can be found in, for example, U.S. Pat. Nos. 4,766,105, 4,808,738, 4,820,675, 5,364,826, 4,829,044, 5,418,202, 5,739,075, 5,545,603, 5,663,385, 5,739,075, 5,801,259, 5,929,259, 6,372,925, and 6,368,998.

According to the U.S. Geological Survey, Mineral Commodity, January 2008, the price of rhenium reached $5,000 per kilogram in January 2007, $7,000 per kilogram in April 2007, and $9,000 per kilogram in September 2007. In early 2008 the price of rhenium surpassed the $10,000 per kilogram mark.

Recent high demand for rhenium and the sharp increase in its cost makes it essential, as well as profitable, to recover rhenium. Accordingly, there has been much interest in finding improved methods for recovering this precious metal. See, for example, U.S. Pat. Nos. 2,967,757, 3,260,658, 3,348,942, 3,407,127, 3,458,277, 3,798,305, 3,862,292, 3,855,385, 3,733,388, 3,932,579, 4,185,078, 4,049,771, 3,244,475, 4,278,641, 4,521,381, 4,557,906, 4,572,823, 4,599,153, 4,599,223, and 7,166,145; U.S. Application Publication Nos. 2003/0119658, 2007/0203351, and 2007/0227903; foreign patent document GB 2 009 119A; as well as literature references *Hydrometallurgy*, Volume 78, Issues 3-4, August 2005, pages 166-171; *Hydrometallurgy*, Volume 85, Issue 1, January 2007, pages 17-23; and *Ind. Eng. Chem. Res.*, Volume 38 (5), 1999, pages 1830-1836.

Most of the art cited above disclose the use of water either alone or in aqueous solutions for extracting rhenium from spent catalysts and other rhenium-containing sources. Particularly in the case of spent ethylene oxide catalysts, a major disadvantage in using water is the concomitant extraction of numerous other metal promoters along with rhenium. These other promoters typically include such elements as Li, Na, Cs, S, P, W, Ni, Hf, Ti, Zr, and/or B. Because of this, the resulting aqueous solution of rhenium will also be contaminated with varying amounts of these other promoters.

Since these other promoters need to be removed in order to recover pure rhenium, several additional steps are typically required to isolate rhenium. One common method for separating rhenium from these other elements is based on the selective adsorption of rhenium. Selective adsorption of rhenium is typically based on ion exchange or carbon adsorption. When adsorptive techniques such as these are used, there is required an additional step of leaching off the adsorbed rhenium before isolating the recovered rhenium. These additional steps increase the complexity and cost of the process while decreasing the efficiency of the process. Furthermore, as the number of steps in the recovery process increases, there is a greater loss of rhenium, which translates into a smaller recovery.

In addition, it is well-known and highly prevalent in the art not only to use aqueous solutions, but to use strong acids (e.g., the mineral acids, such as HCl, $HNO_3$, $H_2SO_4$, aqua regia, and the like), to solubilize and/or process rhenium from a spent rhenium-containing source. As is well known, the corrosiveness of such acids is very high. Because of this, special equipment and handling procedures need to be employed. In addition, safety considerations become a major issue. Further, the use of such strong acids usually necessitates the use of a neutralizing base downstream from the acidification process once rhenium has been separated from other components. The neutralization process very often requires a strong or highly caustic base effective for neutralizing the strong acid. This further increases the need for specialized equipment and special safety measures. The neutralization process also produces more chemical waste. Since the waste must be properly disposed of, the production of this chemical waste becomes another significant financial liability.

From the above survey of the prior art, it is evident that there is a need for a new method for the recovery of rhenium that is simpler (e.g., requiring fewer steps), more efficient, and less costly. There would also be a particular advantage in such a process being selective for the removal of rhenium while in the presence of one or more other elements typically used as active catalyst metals or promoters in ethylene oxide catalysts.

SUMMARY OF THE INVENTION

The present invention provides an improved method for recovering rhenium from catalysts containing rhenium, particularly ethylene oxide catalysts containing rhenium. Ethylene oxide catalysts typically contain at least silver as an additional element. The silver is typically retained on a solid support, typically an oxide support, in the catalyst.

The inventive method involves extracting from the catalyst at least a substantial portion of the rhenium present in the catalyst by intimate contact of the catalyst with one or more polar non-acidic organic solvents such that a rhenium-containing solution is formed. The polar non-acidic organic solvent is substantially free of water and contains one or more oxygen, nitrogen, and/or halogen atoms, and at least one and preferably up to about six carbon atoms in its molecular structure. The rhenium-containing solution contains the polar solvent(s) used in the extraction as well as the extracted rhenium.

Preferably, the polar non-acidic organic solvent extracts rhenium values from the catalyst in a selective manner, thereby leaving virtually all components other than rhenium unextracted. It is also preferred that the one or more polar non-acidic organic solvents have sufficiently low boiling points, typically on the order of about 120° C. or less, so that subsequent evaporation is made facile. This will allow for an easier recovery of rhenium as a concentrated solution or solid while also making possible the ability to more easily recycle the solvent.

The invention advantageously simplifies and makes more efficient the process of recovering rhenium from used ethylene oxide catalysts. The process is simplified since most of the commonly used methods known in the art, e.g., ion exchange and other adsorptive methods, acid/base treatments, oxidation/sublimation treatments, caustic electrolytic methods, and others, can be dispensed with. The process is made more efficient since the process preferably extracts substantially all of the rhenium in a selective manner in a single step without the need for additional treatment and separation steps. The process is also safer and less costly since corrosive acids are not used and waste is preferably minimized by the recycling of solvent.

DETAILED DESCRIPTION OF THE INVENTION

The present invention is directed to a process for selectively recovering rhenium from a catalyst containing rhenium. The catalyst containing rhenium can be any of the catalysts known in the art wherein rhenium is on a solid support. The rhenium may function in any suitable manner, including, for example, as a catalytically active species or promoter. In a particular embodiment, the rhenium-containing catalyst is an ethylene oxidation catalyst. The ethylene oxide catalyst is typically any of the ethylene oxide catalysts commonly known in the art that contain at least silver as the catalytically active species on a solid support.

The support used in the ethylene oxide catalyst is generally a solid, refractory material. The support is typically porous. The support can be made of a material such as, for example, alpha-alumina, charcoal, pumice, magnesia, zirconia, titania, kieselguhr, fuller's earth, silicon carbide, silica, silicon carbide, clays, artificial zeolites, natural zeolites, silicon dioxide and/or titanium dioxide, ceramics and combination thereof. More typically, the support is made of an oxide material, such as silica or alumina. A preferred support includes alpha-alumina having a very high purity; e.g., at least 95 wt. % purity. The remaining components can include inorganic oxides other than alpha-alumina, such as silica, alkali metal oxides (e.g., sodium oxide) and trace amounts of other metal-containing or non-metal-containing additives, promoters, or impurities.

The ethylene oxide catalyst typically contains a catalytically effective amount of silver metal to catalyze the synthesis of ethylene oxide from ethylene and oxygen. The silver can be located on the surface and/or throughout the pores of the refractory support. A catalytically effective amount of silver can be, for example, up to about 45% by weight of silver, expressed as metal, based on the total weight of the catalyst including the support. Silver contents, expressed as metal, of from about 1% to about 40% based on the total weight of the catalyst are more typical, while silver contents of from about 8% to about 35% are even more typical.

Also typically included in the ethylene oxide catalyst are promoting amounts of an alkali metal or a mixture of two or more alkali metals, and/or promoting amounts of a Group IIA alkaline earth metal or a mixture of two or more Group IIA alkaline earth metals, and/or promoting amounts of a main group element or a mixture of two or more main group elements, and/or promoting amounts of a transition metal or a mixture of two or more transition metals, and/or promoting amounts of a rare earth metal or a mixture of two or more rare earth metals. All of these promoters, aside from the alkali metals, can be in any suitable form, including, for example, as zerovalent metals or higher valent metal ions.

Suitable alkali metal promoters include, for example, lithium, sodium, potassium, rubidium, cesium or combinations thereof. Cesium is often preferred, with combinations of cesium with other alkali metals also being preferred. The amount of alkali metal will typically range from about 10 ppm to about 3000 ppm, more typically from about 15 ppm to about 2000 ppm, more typically from about 20 ppm to about 1500 ppm, and even more typically from about 50 ppm to about 1000 ppm by weight of the total catalyst, expressed in terms of the alkali metal.

Suitable alkaline earth metal promoters include, for example, beryllium, magnesium, calcium, strontium, and barium or combinations thereof. The amounts of alkaline earth metal promoters are used in similar amounts as the alkali metal promoters described above.

Suitable transition metals can include, for example, the elements from Groups IIIB (scandium group), IVB (titanium group), VB (vanadium group), VIB (chromium group), VIIB (manganese group), VIIIB (iron, cobalt, nickel groups), IB (copper group), and IIB (zinc group) of the Periodic Table of the Elements, as well as combinations thereof. More typically, the transition metal is an early transition metal, i.e., from Groups IIIB, IVB, VB or VIB, such as, for example, hafnium, yttrium, molybdenum, tungsten, chromium, titanium, zirconium, vanadium, tantalum, niobium, or a combination thereof.

The transition metal or rare earth metal promoters are typically present in an amount of from about 0.1 micromoles per gram to about 10 micromoles per gram, more typically from about 0.2 micromoles per gram to about 5 micromoles per gram, and even more typically from about 0.5 micromoles per gram to about 4 micromoles per gram of total catalyst, expressed in terms of the metal.

Suitable main group elements include any of the elements in Groups IIIA (boron group) to VIIA (halogen group) of the Periodic Table of the Elements. For example, the catalyst can include a promoting amount of one or more sulfur compounds, one or more phosphorus compounds, one or more boron compounds, one or more halogen-containing compounds, or combinations thereof. The catalyst can also include a main group element, aside from the halogens, in its elemental form.

The rare earth metals include any of the elements having an atomic number of 57-103. Some examples of these elements include lanthanum (La), cerium (Ce), and samarium (Sm).

The rhenium component in the catalyst can be in any suitable form, but is more typically one or more rhenium-containing compounds (e.g., a rhenium oxide) or complexes. In ethylene oxide catalysts, the rhenium is typically included to function as a promoter. The rhenium can be present in an amount of, for example, about 0.001 wt. % to about 1 wt. %. But more typically, the rhenium is present in amounts of, for example, about 0.005 wt. % to about 0.5 wt. %, and even more typically, from about 0.01 wt. % to about 0.05 wt. % based on the weight of the total catalyst including the support, expressed as rhenium metal.

The ethylene oxide catalyst being treated by the process herein is typically used (i.e., spent). By "spent" is meant that the catalyst is no longer commercially useful, typically by virtue of a substantially decreased catalytic ability, selectivity, or output. For example, a catalyst can be considered spent if the selectivity of the catalyst has dropped by more than 3% compared to the fresh catalyst. More typically, the catalyst is considered spent if the selectivity has dropped by more than 5%. As another example, a catalyst can be considered spent if it is necessary to increase the reaction temperature by more than 3° C. to maintain the productivity as originally provided by the fresh catalyst. More typically, the catalyst is considered spent if it is necessary to increase the reaction temperature by more than 5° C. to maintain the productivity as originally provided by the fresh catalyst.

Alternatively, the catalyst is not used or spent, but in need of rhenium extraction for another reason. For example, there may arise an amount of rhenium-containing catalyst which is decommissioned due to a change in formulation or change in manufacturing plans. It may be desired to extract the rhenium from decommissioned catalyst and either sell or use the extracted rhenium and other catalyst components.

The ethylene oxide catalyst can be in any suitable form, but more typically in the form of particles, chunks, pieces, pellets, rings, spheres, wagon wheels, cross-partitioned hollow cylinders, and the like, of a size suitable for use in fixed-bed epoxidation reactors. Typically, the support particles have equivalent diameters in the range of from about 3 mm to about 12 mm, and more typically in the range of from about 5 mm to about 10 mm, which are usually compatible with the internal diameter of the tubular reactors in which the catalyst is placed. The term "equivalent diameter" is used to express the size of an irregularly-shaped object by expressing the size of the object in terms of the diameter of a sphere having the same volume as the irregularly-shaped object.

In the process of the invention, rhenium is recovered from an ethylene oxide catalyst by intimate contact of the catalyst with one or more polar non-acidic organic solvents. Preferably, at least 30%, more preferably 40%, and even more preferably, at least 50% of the rhenium is removed (i.e., extracted) from the catalyst. Even more preferably, at least a substantial portion of the rhenium present in the catalyst is extracted from the catalyst. As used herein, a "substantial portion" typically means at least about 85%, more preferably about 90%, more preferably at least about 95%, and even more preferably at least about 98% of the rhenium being removed from the catalyst. Even more preferably, essentially all of the rhenium is removed, which generally refers to at least 99% of the rhenium being removed from the catalyst.

Any method for establishing an intimate contact of the solvent with the catalyst can be used. Preferably, the catalyst is in the form of appropriately diminished chunks or particles that will allow for relatively quick and easy penetration and permeation of the solvent through all spaces and/or pores of the catalyst. To hasten the process, or to improve rhenium recovery values, the catalyst can be suitably ground, pulverized, crushed, powderized, or otherwise diminished in size before or during the extraction process.

Contact between the solvent and catalyst is also improved by including a form of agitation during the extraction process. Agitation will also generally improve the recovery value. Some types of suitable agitation methods include, for example, stirring of the mixture, shaking of the mixture, bubbling of the mixture, boiling the mixture, and/or inversion, tilting, or rotation of the mixture in an open or closed container or pan.

The solvent used herein for this purpose is polar by virtue of having one or more oxygen, nitrogen, and/or halogen atoms in its molecular structure. By being an "organic solvent" is meant that the solvent contains at least one carbon atom in its molecular structure. The solvent can contain any suitable number of carbon atoms and can be of any suitable molecular weight. Preferably, the solvent contains no more than about 20 carbon atoms, more preferably no more than about 12 carbon atoms, and even more preferably, up to about six carbon atoms in its molecular structure. More preferably, the solvent contains up to four carbon atoms. The solvent can include a straight-chained or branched, saturated or unsaturated, cyclic or non-cyclic portion in its molecular structure. Unsaturated solvents can be aliphatic or aromatic.

The solvents are preferably non-acidic since acidic chemicals tend to reduce the selectivity of the process by extracting metals other than rhenium. Acidic chemicals also include some of the other disadvantages of acids, as already discussed above, such as being a safety concern, requiring specialized equipment, and causing the production of more waste.

In one embodiment, the solvent is an alcohol. Some examples of suitable alcohols include methanol, ethanol, n-propanol, isopropyl alcohol, n-butanol, sec-butyl alcohol, isobutyl alcohol, t-butyl alcohol, n-pentanol, 2-pentanol, isopentyl alcohol, neopentyl alcohol, hexanol, allyl alcohol, cyclopentanol, cyclohexanol, and combinations thereof.

In a second embodiment, the solvent is an organic ester. Some examples of suitable organic esters include methyl formate, methyl acetate, ethyl acetate, ethyl formate, vinyl acetate, dimethyl carbonate, ethyl lactate, ethylene carbonate, and combinations thereof.

In a third embodiment, the solvent is a ketone. Some examples of suitable ketones include acetone, butanone (methyl ethyl ketone), ethyl isopropyl ketone, 2-pentanone, 3-pentanone, cyclopentanone, methyl vinyl ketone, acetylacetone (2,4-pentanedione), and combinations thereof.

In a fourth embodiment, the solvent is an organic halide. The organic halide can include any of the known halides, but is more preferably limited to fluoro and chloro derivatives. Some examples of suitable organic halides include chloroform, methylene chloride, carbon tetrachloride, perchloroethylene, 1,1-dichloroethane, 1,2-dichloroethane, perfluorohexane, tetrachloroethane, and combinations thereof.

In a fifth embodiment, the solvent is an amine. Some examples of suitable amines include ethylamine, diethylamine, triethylamine, isopropylamine, diisopropylamine, diisopropylethylamine, n-butylamine, sec-butylamine, isobutylamine, t-butylamine, piperidine, piperazine, ethylenediamine, pyridine, pyrrolidine, diethylenetriamine, morpholine, and combinations thereof.

In a sixth embodiment, the solvent is an organophosphate. The organophosphate is more preferably a trialkylphosphate. Some examples of suitable organophosphates include trimethylphosphate, triethylphosphate, triisopropylphosphate, tributylphosphate, and combinations thereof.

In a seventh embodiment, the solvent is an ether. Some examples of suitable ethers include diethyl ether, diisopropyl ether, di-t-butyl ether, dimethoxyethane, furan, tetrahydrofuran, dioxane, methyl t-butyl ether, 2-methoxyethanol, 2-ethoxyethanol, diglyme, 2-butoxyethanol, and combinations thereof.

In an eighth embodiment, the solvent is an amide. Some examples of suitable amides include formamide, dimethylformamide, dimethylacetamide, N-methylpyrrolidone (NMP), and combinations thereof.

In a ninth embodiment, the solvent is a nitrile. Some examples of suitable nitriles include acetonitrile, propionitrile, butyronitrile, and combinations thereof.

In a tenth embodiment, the solvent is a sulfoxide. An example of a suitable sulfoxide includes dimethylsulfoxide.

Other classes and types of solvents that may be used include the glycols (e.g., ethylene glycol, propylene glycol), glycol ethers (e.g., ethylene glycol monomethyl ether, ethylene glycol monoethyl ether, ethylene glycol dimethyl ether, ethylene glycol diethyl ether), nitro solvents (e.g., nitromethane, nitroethane), aldehyde solvents (e.g., furfural), sulfolane, urea solvents (e.g., 1,3-dimethyl-3,4,5,6-tetrahydro-2(1H)-pyrimidinone (DMPU)), the borate ester solvents (e.g., trimethylborate, triethylborate), hexamethylphosporamide (HMPA), and ionic liquids.

Any combination of the solvents described above can also be used. For example, it may be preferred to use an alcohol in combination with a ketone, or an alcohol in combination with an ether, or an ether in combination with a ketone, and so on. Some embodiments can include, for example, a combination of ethanol and acetone, methanol and acetone, acetone and methyl ethyl ketone, or ethanol and methyl ethyl ketone.

In this invention, it is preferred to use a solvent substantially free of water (dry solvent), i.e., solvent containing, at most, trace amounts of water. The reason for this is that the presence of water in the extraction increases the likelihood of extracting elements other than rhenium from the spent catalyst. A trace amount of water can be, for example, no more than 5% water in the solvent. More preferably, the water content is less than 1%, even more preferably less than 0.5% water, and even more preferably less than 0.1% water.

The extraction process can be conducted using the solvent under normal conditions, i.e., room temperature and normal pressure. Room temperature is approximately within the temperature range of 15-32° C. and normal pressure is about 1 atmosphere. Alternatively, the extraction process can be conducted under higher or lower temperatures or higher or lower pressures. For example, where the solvent has a low boiling point, it may be desired to cool and/or pressurize the solvent during extraction to maintain it as a liquid. For solvents that have high boiling points, it may be desired to heat the solvent and/or lower the pressure to increase the recovery values and/or permit more facile evaporation of the solvent if removal of the solvent is desired.

The extraction process may be conducted under normal air, or alternatively, under a modified atmosphere. A modified atmosphere can be, for example, one which is more or less enriched in oxygen. An atmosphere less rich in oxygen can be provided by, for example, inclusion of other gases, such as hydrogen, nitrogen, argon, or carbon dioxide.

Preferably, the solvent extracts rhenium from the spent catalyst in a selective manner. More preferably, rhenium is removed in a highly selective manner. A highly selective process would be evidenced by the substantially complete removal of rhenium values from the catalyst while leaving most or all other chemical species (i.e., contaminants) substantially unremoved, i.e., unextracted from the catalyst. Some possible contaminants include, for example, silver, the alkali metals, alkaline earth metals, transition metals other than rhenium, main group elements, and rare earth metals. The lower alcohols, esters, and ketones described above are particularly preferred for the selective recovery of rhenium from spent ethylene oxidation catalysts.

The extraction process should be at least somewhat selective in removing rhenium over silver. It is more preferred that the extraction process is highly selective for the removal of rhenium while leaving substantially all of the silver unremoved. The extraction process will also preferably selectively remove rhenium over one or more types of alkali and/or alkaline earth metals, and/or selectively remove rhenium over one or more types of main group elements, and/or selectively remove rhenium over one or more types of transition metals, and/or selectively remove rhenium over one or more types of rare earth metals.

It is preferred that the extraction process can extract at least 30, 40, or 50% of the rhenium values while at least 80%, more preferably 90%, and more preferably at least 95%, of one or more contaminant species remain unextracted from the catalyst. More preferably, at least 80%, more preferably 90%, more preferably 95%, and even more preferably at least 98% of the rhenium values is extracted while at least 80%, more preferably 90%, and even more preferably at least 95%, of contaminant species remain unextracted from the catalyst. Even more preferably, at least 98%, and more preferably 99%, of the rhenium values is extracted while at least 98%, and more preferably 99%, of contaminant species remain unextracted. Most preferably, rhenium is selectively removed, as above, over all other chemical species present in the catalyst.

The extraction results in a rhenium-containing solution. Some form of separation of the resulting solution from the solid materials of the catalyst generally needs to be employed. If desired, filtration can be used after or during extraction for this purpose. Alternatively, the support or other solids can be kept separated from the solution during the extraction process so that subsequent filtration is not required. Some ways this can be accomplished include, for example, containing the spent catalyst within a net or semipermeable membrane during the extraction, or settling of the solid material in conjunction with removal of the top layer of solvent, such as by decanting, or by replenishment and overflow of solvent.

A continuous extraction process can also be used. For example, a countercurrent of washing solution can be employed in combination with a moving bed of spent catalyst. In addition, solvent can be continuously recycled by being used in the extraction process, recovered, and then re-used.

In one embodiment, solvent is continuously used and recycled by employing a Soxhlet setup. In a Soxhlet setup, the spent catalyst is placed in an open container, and the open container placed in an enclosed container charged with an extracting solvent. The extracting solvent is made to evaporate by heating. The evaporating solvent condenses into the open container and begins extracting rhenium from the catalyst. As the evaporation and condensation continues, the solvent in the container holding the catalyst fills up. Once filled, the solvent containing rhenium can be siphoned off or otherwise transferred back into the larger container, where the used solvent is again made to evaporate and condense back into the container holding the spent catalyst. In this way, fresh solvent continuously replenishes the solvent removed from the open container while the rhenium-containing solution held in the outer container becomes more concentrated. The cycle can be repeated any desired number of times, such as, for example, five, ten, or twenty cycles.

The rhenium-containing solution, as obtained by the extraction process, may be used as is without further processing. However, more likely, further processing is required to make the rhenium more usable as an end product. For example, it may be preferred to concentrate the rhenium solution. Any of the known methods for concentrating solutions may be used. A preferred method for concentrating the solution includes evaporation of a portion of the solution by, for example, heating and/or depressurization. Removal of solvent by other methods, such as selective solvent absorption or ultrafiltration methods, can also be employed. It may also be preferred to remove substantially all solvent from the rhenium-containing solution to provide a solid rhenium product.

Evaporation methods using heat and/or vacuum are generally more preferred for removing a portion of the solvent. Accordingly, in order to make the evaporation process more facile, it is preferable for the solvents to have a boiling point no more than 120° C. under a standard pressure of about 1 atmosphere. Even more preferably, the solvents have a boiling point no more than 100° C. under a standard pressure of about 1 atmosphere. The lower alcohols, esters, and ketones described above, particularly those having no more than four carbon atoms, are particularly preferred since they generally have lower boiling points than the other solvents.

In a preferred embodiment, a substantial portion of evaporated solvent is recovered. A significant portion of solvent can be contained in the pores of the catalyst after the catalyst has been treated by the method described above. It is highly beneficial to recover the solvent trapped in the wet catalyst as well. Accordingly, it is contemplated herein to recover not only solvent from the resulting rhenium solution, but also solvent contained within the wet catalyst. The recovered solvent can advantageously be re-used in the extraction process. The recovery and re-use of solvent advantageously reduces waste, and hence cost, while also reducing the negative environmental impact of discharging solvent vapors into the atmosphere.

In a preferred embodiment, recovery and re-use of solvent is provided by a continuous extraction process. The continuous extraction process can, for example, make use of a Soxhlet setup. In a Soxhlet setup, the spent catalyst is placed in an open container, and the open container placed in an enclosed container charged with an extracting solvent. The extracting solvent is made to evaporate by heating. The evaporating solvent condenses into the open container and begins extracting rhenium from the catalyst. As the evaporation and condensation continues, the solvent in the container holding the catalyst fills up. Once filled, the solvent containing rhenium can be siphoned off or otherwise transferred back into the larger container, where the used solvent is again made to evaporate and condense back into the container holding the spent catalyst. In this way, fresh solvent continuously replenishes the solvent removed from the open container while the rhenium-containing solution held in the outer container becomes more concentrated. The cycle can be repeated any desired number of times, such as, for example, five, ten, or twenty cycles.

The rhenium solution may be subjected to other processing methods or chemical reactions in order to make a usable rhenium-containing end product. For example, a metal chelating agent, precipitant, polymer, or other substance may be added to the solution to cause the precipitation of, for example, a rhenium compound. The rhenium compound can be, for example, a rhenium-chelate complex, a rhenium-polymer complex, or a rhenium material, such as an oxide, sulfide, halide, or complex ion (e.g., silicate, carbonate, nitrate, tungstate) of rhenium. Alternatively, the solution can, for example, be chilled, heated, electrolyzed (e.g., to produce rhenium metal or metal alloy), allowed to stand for a period of time under specified conditions, or exposed to an oxidizing or reducing agent, as part of a process for yielding a suitable rhenium-containing end product.

The rhenium-containing end product can be used to produce any other end product which requires the incorporation of rhenium. For example, the rhenium thus obtained, either as an original or modified solution from the extraction process, can be used to treat a catalyst precursor (e.g., a catalyst support) to incorporate rhenium therein to produce a fresh catalyst containing rhenium. The catalyst preferably being considered here for regeneration is an ethylene oxide catalyst. For regeneration of an ethylene oxide catalyst, a refractory support can be impregnated and incorporated with rhenium and silver, along with any desired promoters, by any of the procedures known in the art. Impregnation procedures are described in, for example, U.S. Pat. Nos. 4,761,394, 4,766,105, 4,908,343, 5,057,481, 5,187,140, 5,102,848, 5,011,807, 5,099,041 and 5,407,888, and the procedures described therein for impregnation of supports are all incorporated by reference herein. In addition, any of the known procedures of pre-deposition, co-deposition, and post-deposition of the various promoters can be employed.

The rhenium-containing end product can also be, for example, a rhenium-metal alloy. For example, the rhenium may be used to make platinum-rhenium catalysts that are used in gasoline and hydrocarbon processing. The rhenium may also be used in making tungsten-rhenium alloys useful for filaments and thermocouples. The rhenium may also be used as an additive in nickel-based superalloys used in the manufacture of turbine blades and gas turbine engines.

Examples have been set forth below for the purpose of further illustrating the invention. The scope of this invention is not to be in any way limited by the examples set forth herein.

In the following examples, the spent catalyst was an ethylene oxide catalyst that had been used for an extended period of time. The catalyst contained a catalytically effective amount of silver on a low surface area carrier and also contained rhenium, cesium, lithium, tungsten and sulfur. The catalyst was prepared as illustrated in, for example, U.S. Pat. Nos. 4,766,105, 4,808,738, 4,820,675, and 5,364,826.

Comparative Example A

Use of a Prior Art Method

In a standard laboratory vessel, 50 parts of the spent catalyst were soaked at room temperature in 100 parts water. The water was circulated around the catalyst pellets using a small pump for two hours. At the end of the extraction, the aqueous solution was separated from the catalyst and analyzed for its contents.

Comparative Example B

Use of a Prior Art Method

The same procedure of Comparative Example A was repeated with the exception that the temperature of the water was maintained at 80° C. by using a small immersion heater and a temperature controller.

Example 1

Use of Ethanol (EtOH) for Extracting Rhenium

The same procedure of Comparative Example A was repeated with the exception that ethanol was used instead of water.

Examples 2, 3, 4

Use of Ethanol for Extracting Rhenium While Varying Extracting Time

The procedure of Example 1 was repeated with the exception that the extraction time was reduced to 60, 30, and 15 minutes, for Examples 2, 3, and 4, respectively. The results of the analysis are summarized in Table 1, expressed as the percentage of the elements that were extracted from the catalyst.

TABLE 1

| Example | Extraction temperature ° C. | Extraction time Min. | Extracted Re % | Extracted elements % | | | |
|---|---|---|---|---|---|---|---|
| | | | | Cs | W | Li | S |
| Comparative Example A (water) | 25 | 120 | 93.3 | 55.0 | 28.9 | 60.5 | 100 |
| Comparative Example B (water) | 80 | 120 | 89.6 | 61.7 | 55.1 | 58.5 | 100 |
| Example 1 (EtOH) | 25 | 120 | 78.3 | 6.9 | 0 | 10 | 0 |
| Example 2 (EtOH) | 25 | 60 | 54.7 | 5 | 0 | 8.2 | 0 |
| Example 3 (EtOH) | 25 | 30 | 40.7 | 1 | 0 | 6 | 0 |
| Example 4 (EtOH) | 25 | 15 | 30.5 | 0.5 | 0 | 5.5 | 0 |

As shown by Table 1, the aqueous extraction procedure of Comparative Example A shows a rhenium extraction value of about 93%. However, the amounts of contaminating cesium (Cs), tungsten (W), lithium (Li), and sulfur (S) are significant, with sulfur, in particular, being completely extracted into the solution from the catalyst. As shown in Comparative Example B, the amount of contaminant extraction increases with an increase in temperature for the aqueous system. The prior art procedure is thus shown to be highly unselective for rhenium, and accordingly, unacceptable for the purposes of the present invention.

Example 1 of the present invention uses ethanol instead of water. Comparative Examples A and B, and Example 1, use an equivalent amount of time of two hours for the extraction. Yet, in contrast to Comparative Examples A and B, Example 1 shows an effective extraction of rhenium (about 78%) in combination with a significantly reduced extraction of contaminants. For example, Table 1 shows that, using ethanol in Example 1, the cesium value dropped to 6.9% from 55.0%, the tungsten value dropped to 0% from 28.9%, the lithium value dropped to 10% from 60.5%, and the sulfur value dropped to 0% from 100%. As compared to Comparative Example A, the contaminant values in Example 1 are only 12.5%, 0%, 16.5%, and 0%, of the respective values shown for Comparative Example A.

Example 2 was conducted with ethanol in the same manner as Example 1, except that the amount of time was reduced by one-half to 60 minutes. As shown for Example 2, the amount of extracted rhenium was reduced to 54.7%, but the amount of extracted contaminants is even further reduced compared to Example 1.

Examples 3 and 4 were also conducted with ethanol in the same manner as Example 1, except that the amount of time was reduced to 30 and 15 minutes, respectively. As shown, further decreases in extraction time using ethanol also result in lower rhenium extraction values along with decreased contaminant extraction values.

Example 5

Continuous Extraction Using Ethanol

In this example, a Soxhlet extraction setup was used for the continuous extraction of the rhenium value. 25 parts of the spent catalyst was placed in an extraction cup and 90 parts of ethyl alcohol was placed in the extraction flask. The solvent was heated until it started to boil and the vapors were condensed and refluxed over the spent catalyst. When the catalyst cup became filled with solvent, the solvent was siphoned back to the boiling flask, carrying with it the dissolved rhenium values. The extraction continued for about one hour. Through that period there were seven complete cycles of extraction. The flask containing the solvent and the extracted material were allowed to cool down to room temperature before they were analyzed for their contents of extracted elements.

Example 6

Use of Isopropanol (iPrOH) for Extraction of Rhenium

The procedure of Example 5 was repeated with the exception that the ethyl alcohol was replaced with isopropyl alcohol.

Example 7

Use of Acetone for Extraction of Rhenium

The procedure of Example 5 was repeated with the exception that the ethyl alcohol was replaced with acetone.

Example 8

Use of Methyl Ethyl Ketone (MEK) for Extracting Rhenium

The procedure of Example 5 was repeated with the exception that the ethyl alcohol was replaced with methyl ethyl ketone.

The results of the extraction procedure in Examples 5-8 are summarized in Table 2, expressed as the percentage of the elements that were extracted from the catalyst. As shown in Table 2, Examples 5 and 7 show that a substantial portion, or substantially all, of the rhenium has been extracted while leaving a substantial portion, or all, of the contaminant species unextracted. Examples 6 and 8 show lower rhenium recoveries but a reduced amount of extraction of contaminant species.

TABLE 2

| Example | Extracted Re % | Extracted elements % | | | |
|---|---|---|---|---|---|
| | | Cs | W | Li | S |
| Example 5 (EtOH) | 96 | 19 | 0.0 | 0.0 | 0.0 |
| Example 6 (iPrOH) | 36.9 | 3.3 | 0.0 | 0.0 | 0.0 |
| Example 7 (acetone) | 99.0 | 18.1 | 0.0 | 0.0 | 0.0 |
| Example 8 (MEK) | 57.3 | 0.0 | 0.0 | 0.0 | 0.0 |

Example 9

Impregnation of Catalyst Support Using Recovered Rhenium

Example 7 was repeated as described, except that the extracting solution was placed in a distillation setup. The acetone solvent was allowed to evaporate until only 4.6 parts was left in the flask. The concentrated solution contained all of the rhenium that was extracted from the spent catalyst. This solution was added to a flask containing 29% Ag in the form of silver oxalate/ethylene diamine complex as well as cesium-, lithium-, tungsten-, and sulfur-containing compounds. The mixture was used as an impregnating solution to prepare a fresh, high-selectivity catalyst. An incipient impregnation method, as known in the art, was used to impregnate an α-alumina carrier, and then calcined. The concentrations of the different additives, including rhenium, in the impregnating solution were calculated to give the desired catalyst composition after calcination. The catalyst was used as a high selectivity catalyst and at its peak performance a selectivity of 91% was achieved.

While there have been shown and described what are presently believed to be the preferred embodiments of the present invention, those skilled in the art will realize that other and further embodiments can be made without departing from the spirit and scope of the invention described in this application, and this application includes all such modifications that are within the intended scope of the claims set forth herein.

What is claimed is:

1. A method for recovering rhenium from a catalyst containing rhenium on a solid support, the method comprising extracting from the catalyst at least a substantial portion of the rhenium by intimate contact of the catalyst with one or more polar non-acidic organic solvents substantially free of water such that a rhenium-containing solution is formed containing said polar non-acidic organic solvent and extracted rhenium, wherein said polar non-acidic organic solvent contains one or more oxygen, nitrogen, and/or halogen atoms in its molecular structure.

2. The method according to claim 1, wherein the catalyst contains rhenium and at least silver on a solid support.

3. The method according to claim 1, wherein the one or more polar non-acidic organic solvents are selected from the group consisting of alcohols, organic esters, ketones, organic halides, amines, organophosphates, ethers, amides, and nitrites.

4. The method according to claim 1, wherein the one or more polar non-acidic organic solvents are selected from the group consisting of alcohols, esters, and ketones.

5. The method according to claim 1, wherein the polar non-acidic organic solvent is ethanol.

6. The method according to claim 1, wherein the polar non-acidic organic solvent is isopropyl alcohol.

7. The method according to claim 1, wherein the polar non-acidic organic solvent is acetone.

8. The method according to claim 1, wherein the polar non-acidic organic solvent is methyl ethyl ketone.

9. The method according to claim 1, wherein the polar non-acidic organic solvent is heated during the extraction.

10. The method according to claim 1, further comprising concentrating the rhenium-containing solution by removal of a portion of the polar non-acidic organic solvent.

11. The method according to claim 1, further comprising treating the rhenium-containing solution in such a manner that the rhenium contained therein is converted into a solid form.

12. The method according to claim 11, wherein a solid form of the recovered rhenium is obtained by substantially removing the polar non-acidic organic solvent of the rhenium-containing solution.

13. The method according to claim 2, wherein the polar non-acidic organic solvent selectively removes rhenium over silver from the catalyst.

14. The method according to claim 1, wherein the catalyst further contains one or more types of alkali and/or alkaline earth metals.

15. The method according to claim 14, wherein the polar non-acidic organic solvent selectively removes rhenium over silver and the one or more types of alkali and/or alkaline earth metals.

16. The method according to claim 14, wherein the catalyst is an ethylene oxide catalyst and further contains one or more types of main group elements selected from Groups IIIA to VIIA of the Periodic Table, and/or early transition metal elements selected from Groups IIIB-VIB of the Periodic Table.

17. The method according to claim 16, wherein the polar organic solvent selectively removes rhenium over silver, the one or more types of alkali metals, and the one or more types of main group elements and/or early transition metal elements.

18. The method according to claim 1, further comprising using the rhenium-containing solution to produce a rhenium-containing end product.

19. The method according to claim 18, wherein the rhenium-containing end product is a rhenium compound.

20. The method according to claim 18, wherein the rhenium-containing end product is a rhenium-containing catalyst.

21. The method according to claim 20, wherein the rhenium-containing catalyst is a rhenium-containing ethylene oxide catalyst.

22. The method according to claim 1, wherein the treated catalyst contains pores and further comprising a continuous extraction process in which solvent from the rhenium-containing solution and/or pores of the treated catalyst is evaporated and condensed to provide recycled solvent, the recycled solvent being re-used for extraction of rhenium.

* * * * *